Figure 3:
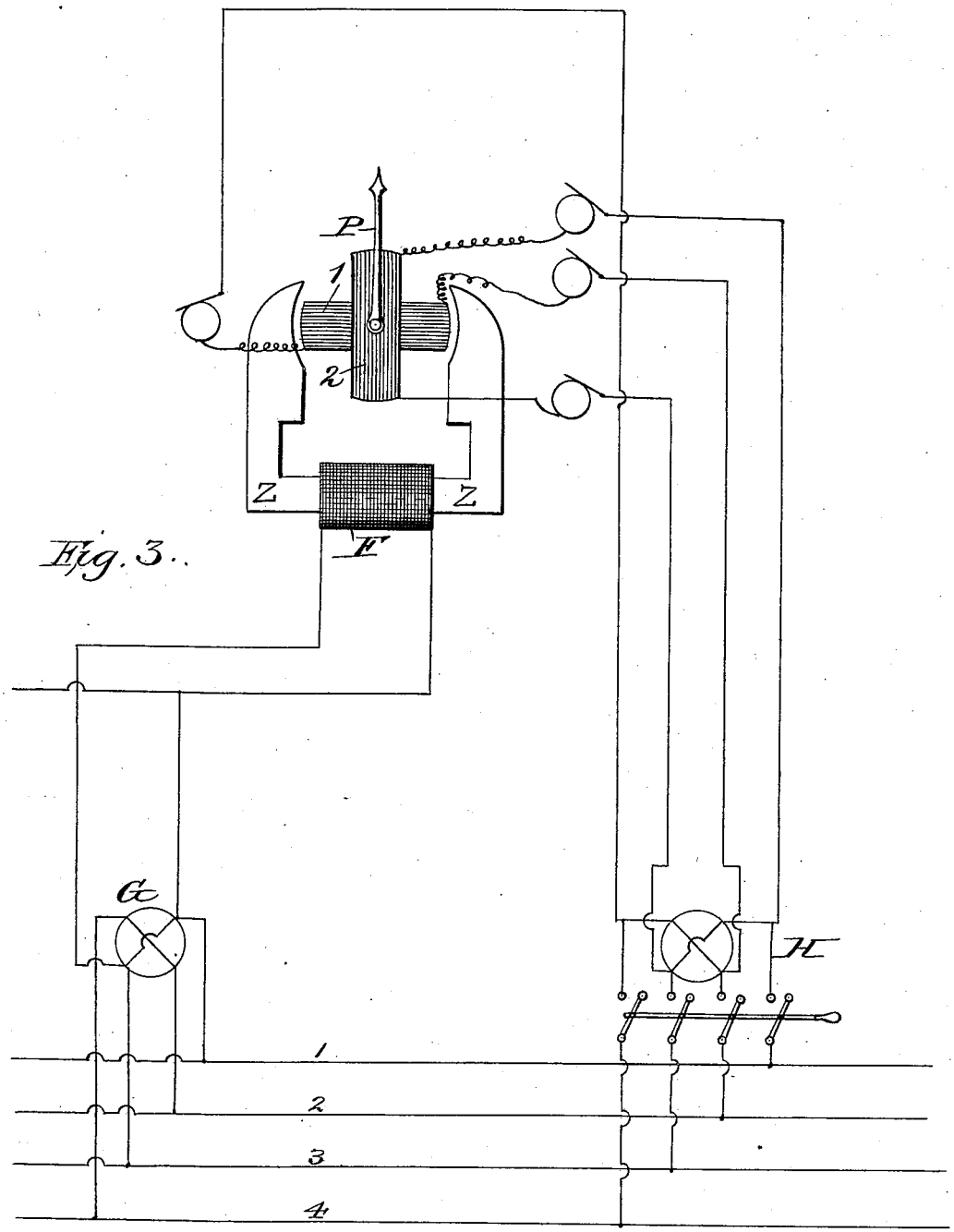

No. 685,155. Patented Oct. 22, 1901.
P. M. LINCOLN.
SYNCHRONISM INDICATOR.
(Application filed Mar. 27, 1901.)
(No Model.) 3 Sheets—Sheet 1.
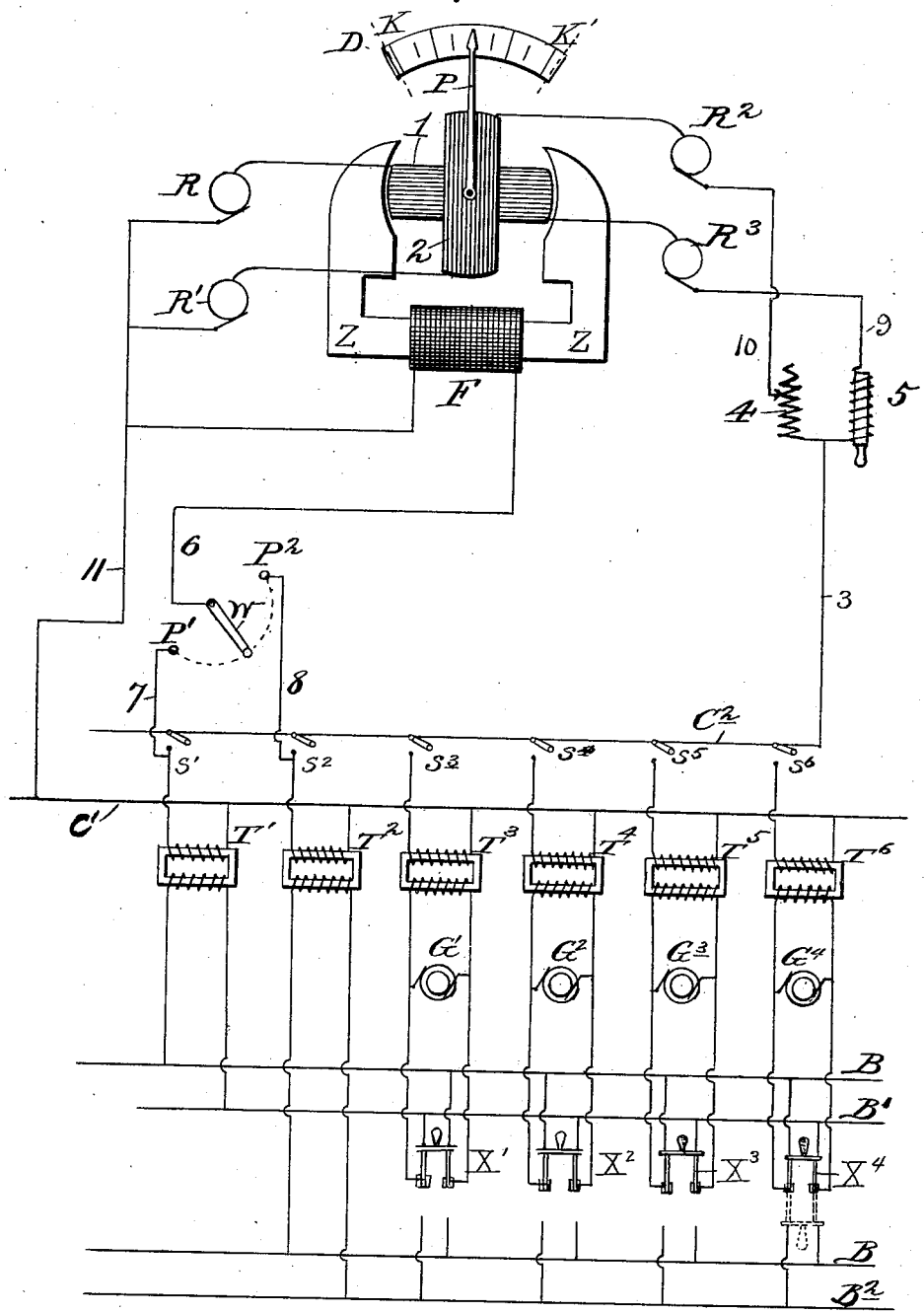

No. 685,155. Patented Oct. 22, 1901.
P. M. LINCOLN.
SYNCHRONISM INDICATOR.
(Application filed Mar. 27, 1901.)
(No Model.) 3 Sheets—Sheet 2.
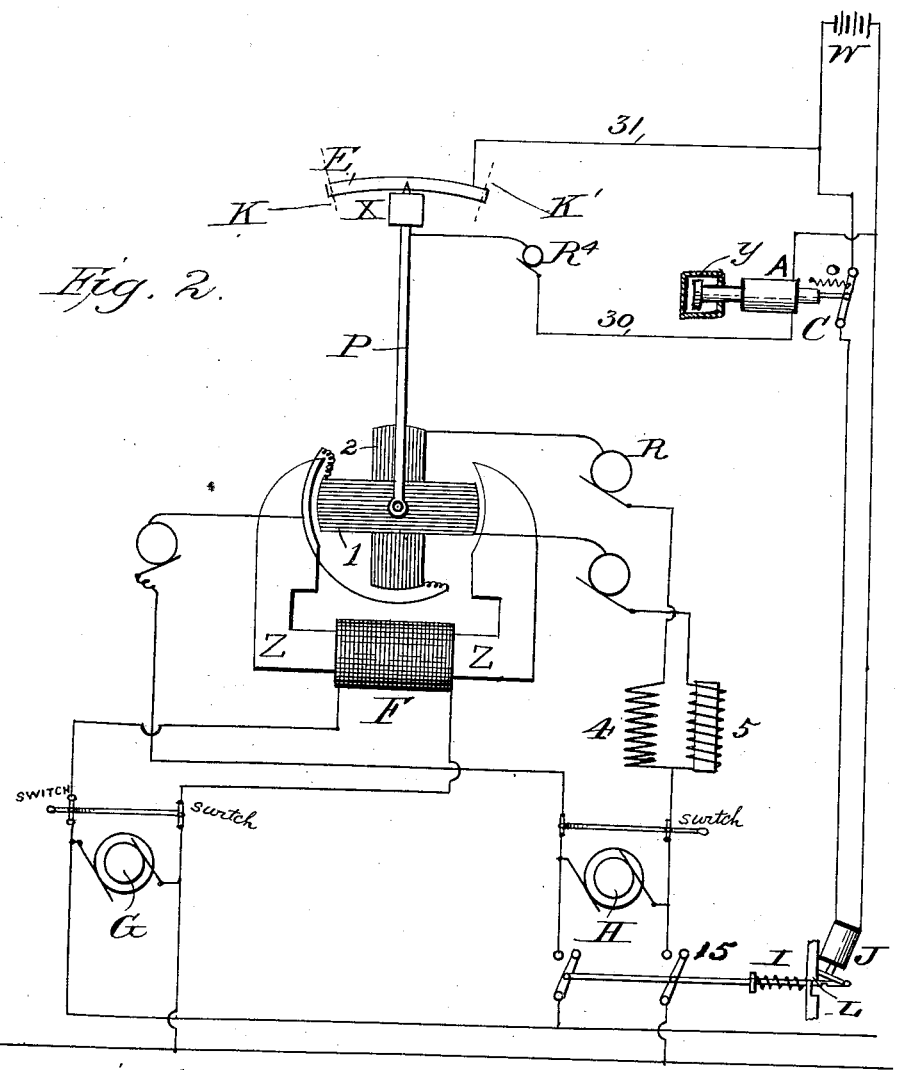
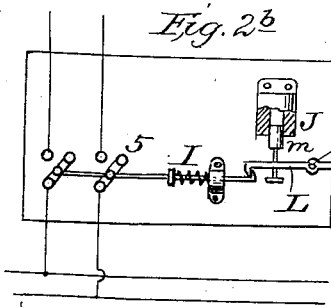
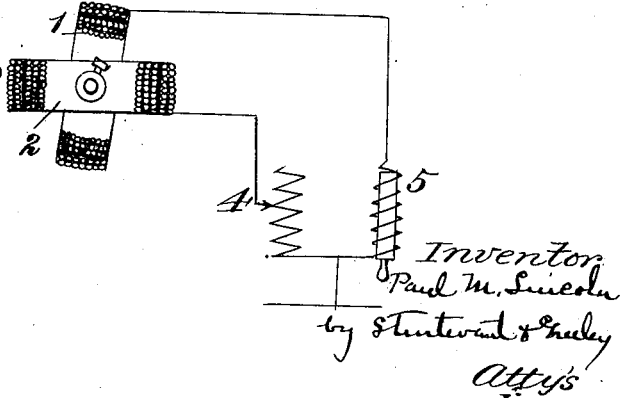
Witnesses:
F. L. Orwand.
Albert Popkins
Inventor
Paul M. Lincoln
by Sturtevant & Greeley
Atty's

UNITED STATES PATENT OFFICE.

PAUL M. LINCOLN, OF NIAGARA FALLS, NEW YORK.

SYNCHRONISM-INDICATOR.

SPECIFICATION forming part of Letters Patent No. 685,155, dated October 22, 1901.

Application filed March 27, 1901. Serial No. 53,124. (No model.)

*To all whom it may concern:*

Be it known that I, PAUL M. LINCOLN, a citizen of the United States, residing at Niagara Falls, in the county of Niagara, State of New York, have invented certain new and useful Improvements in Synchronism-Indicators, of which the following is a description, reference being had to the accompanying drawings, and to the letters and figures of reference marked thereon.

My invention relates to an improvement in synchronism-indicators.

Its object is not only to produce an instrument for indicating the phase and frequency relation of two separate sources of electromotive forces which will combine the advantages of simplicity, cheapness, durability, accuracy, and reliability, but it may be used in connection with other new and useful improvements hereinafter described to permit of the automatic connection in parallel of circuits carrying currents of unknown frequency and phase with safety and effectiveness.

Synchronism-indicators which have heretofore been used have been lacking in the element of accuracy and sensitiveness at or near the point of phase and frequency, coincidence where accuracy and sensitiveness are most important, and in consequence the operation of coupling in parallel two or more alternating-current machines has been a delicate one, requiring the presence of an attendant, who must have experience and familiarity with the indicating apparatus, to throw the connecting-switch.

The automatic devices heretofore used have been open to several objections. While it is desirable that the electromotive forces of the two circuits when connected should coincide in phase as nearly as possible, it is a fact well known in practice that if connection be made at the instant the two electromotive forces are within a certain limited angle of phase difference the currents carried by the paralleling-switch will not exceed the limit of safety and the two generators will be automatically pulled into the exact step or synchronism with each other. This limited phase-angle difference within which the connection can be made with the effect above mentioned I have termed the "arc of safety" in the description which follows. It is evident from a consideration of the question that this arc of safety is passed over with great rapidity when the frequency of the two electromotive forces or the speed of the two machines is materially different and that as the same frequency or speed is approximated the arc of safety is maintained for a correspondingly-longer period. In order that the switch may be thrown with deliberation, if done by hand, or to permit the ready movement of the related parts before the arc of safety is exceeded, if automatic devices are utilized, it is necessary in practice that the frequency difference of the two circuits be sufficiently reduced to maintain the arc of safety for a suitable time. In automatic devices heretofore used this feature has been neglected and they have been designed to operate at phase coincidence without regard to the time the arc of safety is maintained, thereby being rendered inoperative for practical purposes.

Briefly, for my phase-responsive device I make use of an instrument which consists of two systems of coils relatively movable. One system consists of two coils relatively fixed in position, having their magnetic axes angularly displaced and so connected as to carry currents supplied from the same machine or source of electromotive force and differing in phase. The other system consists of a single coil in inductive relation to the other two coils and so connected as to carry a current supplied from another source of electromotive force which it is desired to compare in respect to phase and frequency with the first source. If the single coil carries a current whose phase bears some definite constant relation to the phase of electromotive force in one circuit and the two coils of the other system carry currents of displaced phase, but which also bear definite phase relation to the electromotive force of the other circuit, the movable system will take up a position dependent upon the phase difference of the two electromotive forces. As this phase difference is altered the relative position of the movable member will be altered correspondingly and proportionately. If the two relatively-fixed coils are disposed at an angle of ninety degrees, if the currents flowing therein are in quadrature, and if the ampere-turns are equal, a change in the phase angle between the stationary and movable systems will be followed by an exact corresponding change in the angular position of the latter. With these conditions only approximately complied with the change in angular position is not necessarily proportional to the change in phase angle. This instrument is also responsive to changes in direction of phase change—that is, for a phase change between the stationary and movable elements in one direction the movable element will rotate, say, clockwise, and for a reversal of the direction of phase change the movable element will rotate counter-clockwise.

Primarily, my invention consists of a synchronism-indicator responsive to the phase differences of any two circuits or sources of electromotive force to which it may be connected. It will be clear that this instrument may be used to indicate both qualitatively and quantitatively the phase and frequency relations of any two circuits.

Secondly, the invention consists of a synchronism apparatus of the character described having automatic means set in operation by the phase-responsive device for closing the paralleling-switch.

Thirdly, the invention consists of a synchronism apparatus of the character described having means for closing the paralleling-switch at the proper moment of phase coincidence and additional means for preventing the closing of such switch except during such time as the dynamos are within the arc of safety.

Finally, the invention consists in the matters hereinafter described, and referred to in the appended claims.

In the accompanying drawings, which illustrate the invention, Figure 1 represents the mechanism of my improved synchronism-indicator, partly in diagram. Fig. 2 is a diagrammatic view of the same, illustrating the various automatic and auxiliary features forming part of my invention. Fig. 2$^a$ is a detail view illustrating the operation of the electromagnetic trip. Fig. 3 is a diagrammatic view of the application of the same for a two-phase system, and Fig. 4 shows a modified form of indicator.

In the drawings, and referring first to Fig. 1, F represents the element consisting of the single coil, here shown wound upon a core Z, of laminated magnetic material. The movable member is composed of two coils 1 and 2, in practice preferably wound upon a laminated core, the planes of which are relatively disposed at an angle, preferably ninety degrees. This angle, however, may be varied within a certain limit without materially affecting the accurate working of the device. It is evident that the coil F might be the movable member and the coils 1 and 2 be fixed in position instead of as shown, such an arrangement being within the contemplation of my invention.

$G'$ $G^2$, &c., are alternating-current units, each of which may be connected to either set of bus-bars B B' or B B$^2$ through the double throw-switches X' X$^2$ X$^3$ X$^4$, &c. Since the voltage of generators is usually too high to be connected directly to measuring and indicating instruments, the generator voltage is stepped down by means of transformers T$^3$ T$^4$, &c. The primary of each of these transformers is connected to a circuit derived from its corresponding unit. One side of each secondary is connected to a common conductor C', while the opposite terminal may be connected to a second conductor C$^2$ by means of the switches $s^3$ $s^4$ $s^5$, &c. The primary of T' is connected to the bus-bars B B' and the primary of T$^2$ to the bus-bars B B$^2$. The secondaries of these two transformers are connected to the conductors C' and C$^2$ in a similar manner to the secondaries of the remaining transformers. One terminal of the coil F is connected to the conductor C' through lead 11, and the other may be connected at will to the terminal of either transformer T' or T$^2$ opposite to that connected to conductor C'. This is accomplished by the lead 6, the two-point switch W, contacts P' and P$^2$, and leads 7 and 8. The coils 1 and 2 are mounted upon the same axis and are free to turn without the restraining influence of any spring or other mechanical check. They are permanently connected to the conductors C' and C$^2$ through the two parallel circuits 9 and 10, which form branches of the circuits 3 and 11, connected across C' and C$^2$. Current is conducted to and from the coils 1 and 2 by the slip-rings R, R', R$^2$, and R$^3$. If desired, slip-rings R and R' may be made identical and both currents brought out through one ring. In the branch 9 of the circuits 3 and 11 is placed an inductive resistance 5 and in branch 10 a non-inductive resistance 4. By this means a difference of phase, never reaching but approximately ninety degrees, is produced in the currents carried by coils 1 and 2. Exact quadrature between currents in 1 and 2 can be made to occur by any of the well-known means—for instance, by inserting sufficient capacity into the circuit of coil 2—as, for example, placing a condenser of proper size in shunt with the resistance 4, or causing to flow through coil 2, in addition to that flowing through inductance 5, a proper amount of current differing in phase by one hundred and eighty degrees from that flowing through coil 1. Such one-hundred-and-eighty-degree current could be obtained from the secondary of a transformer across the main circuit.

P is an arm or pointer rigidly attached to the movable coils.

D is a dial-face suitably placed and provided with a scale, so that the angular deviation of the pointer P from its normal or zero position may readily be determined.

The operation is as follows: Suppose it be desired to synchronize machine G$^2$ with bus-bars B B'. The switch W is moved to the contact P', thereby energizing the field F from the bus-bars B B'. The switch $s^4$ is now closed, energizing coils 1 and 2 from the machine $G^2$. When there is coincidence in phase between $G^2$ and B B', the pointer P will assume the zero position and any difference in phase will be indicated by the pointer assuming a new position displaced from the zero position by an angle corresponding to the phase-angle difference. The zero position may be determined once for all by obtaining currents for both movable and stationary elements from the same source. In the above instance this could readily be effected by first closing switch $s'$ and determining the zero position, after which $s'$ would be opened and $s^4$ closed, as described. When $s^4$ is closed, the pointer will therefore move rapidly over the face of the dial at first, but more slowly as the frequency of the machine $G^2$ approaches that of B B'. When the frequency of $G^2$ is sufficiently close to that of B B' that the arc of safety represented by the angle between K and K' on the dial D is maintained for a suitable period, the switch $X^2$ may be thrown and $G^2$ connected to B B'. It will be observed that the rate of movement of the pointer is an indication of the frequency or speed difference of the two machines, that the direction of movement will indicate which has the highest speed, and the angular displacement from the zero position shows the phase difference at any given instant. It is evident that the same instrument may be used to synchronize any number of generators with one of any number of bus-bars by an obvious extension of the above-described system and that the bus-bars may be synchronized with each other, if desired.

It is to be observed that the connections of the working coils of the phase-responsive device are not limited to the arrangement shown, but any connections may be used which will properly excite the two systems of coils with currents derived from the two sources of electromotive force under comparison.

It is imaginable that extra sensitiveness may be desired at some point in the cycle of phase change. For instance, it may be desirable in some cases to have the point of synchronism indicated with more delicateness than would be the case where the angle made by the indicating-hand is always exactly equal to phase difference between the two electromotive forces. In other words, it might be desirable to make the angular deviation of the pointer change faster than the phase-angle at and near the point of synchronism. This can be accomplished to any desired extent by relatively increasing the ampere-turns of that armature-coil whose plane at the point of synchronism lies nearest parallel to the direction of the lines of force of the field. For instance, (referring to Fig. 1,) synchronism will evidently be indicated when the plane of coil 1 lies nearly parallel to the lines of force of Z. If, therefore, it is desired to make the device supersensitive at the point of synchronism and one hundred and eighty degrees from that point, it can be done by making the ampere-turns of 1 relatively larger than those of 2. This produces at the same time a low degree of sensitiveness at the plus-ninety-degree and minus-ninety-degree points when coil 2 lies nearly in the plane of the field of Z.

The above statement is made on the assumption that there is considerable non-inductive resistance in circuit with F compared to its inductive resistance and that therefore the current in that circuit is practically in phase with its electromotive force. In practice the position of the zero-point will depend upon the ratio of non-inductive to inductive resistance in circuit F, but the principle of operation above stated will not be affected by the ratio of inductive to non-inductive resistance.

I have further discovered that supersensitive and subsensitive points can be made to occur on diameters about forty-five degrees from the zero-point by causing the current in 1 and 2 to differ in phase by other than ninety degrees, or by making the mechanical angle between 1 and 2 other than ninety degrees, or by a proper combination of these two methods. It is further possible by these three adjustments, used severally or in combination, to make these supersensitive and subsensitive points occur on any desired diameter at any point in the cycle.

Fig. 4 shows a construction of the two relatively-fixed coils which when used in connection with an adjustable phase-modifying means may be employed to effect any of the adjustments above indicated. The two relatively-fixed coils are each wound in two different sections, so that the above method of changing the ampere-turns may be employed to give supersensitive points by merely cutting out of circuit a section on one or the other coil. The coils are so mounted that the mechanical angle between them may be adjusted to any desired degree, while the electrical angle may be varied by adjusting the phase-modifying means shown. It is evident that any combination of these methods of adjustment above described may be employed in connection with this instrument. The adjustment of the mechanical angle may also be employed to compensate for any departure of the currents in the two coils from exact quadrature. I have discovered that by making the mechanical angle between the two coils equal to the supplement of the electrical angle the distortion of the indication or the production of supersensitive and subsensitive points which would normally result is prevented and a strict proportionality is maintained between the phase-angle difference and angular departure of the indicator from its zero position. It is evident, then, that the device shown in Fig. 4 may be adjusted to maintain the proportionality when desired, even when quadrature between the currents in the two coils is widely departed from.

As a further and special improvement I have provided an automatic device which will close the paralleling-switch at the proper moment. I also arrange an auxiliary contact so that an electric circuit is closed during the time the dynamos are within the arc of safety, thus taking advantage of the fact that there is a margin on each side of the exact point of synchronism in which the main switch paralleling the dynamos can be closed safely. A time element device is also provided, so that this contact must be maintained a given length of time before the main switch is closed.

Referring to Fig. 2, G represents an alternating-current dynamo already running on bus-bars, and H is the dynamo which it is desired to throw in. The switch 15 of the dynamo H is held open by the detent L, pivoted at o, which is withdrawn by the energization of the electromagnet J, which attracts the core m, and when withdrawn the spring I closes the main switch 5. The core m of the electromagnet J is free to move some distance before it engages with the detent L, which detent holds the switch in its open position. The advantage of this arrangement is that the detent L is struck a blow of some force, so that the disengagement of the switch will be positive. The magnet A is included in a circuit 30 31, shunted across the source of power W. This circuit is completed through a contact-plate E, a contact finger or piece X, adapted to engage therewith and carried by the hand or pointer P. The finger X is connected with lead 30 through the collecting-ring R⁴. The circuit through A is therefore only completed while the finger X is in contact with E, the latter being located so as to embrace the arc of safety. It is thus supposed that the switch 15 may be closed with safety while the hand or pointer P is passing from K and K', or vice versa. Y is a time-element device, such as a dash-pot, in which the armature of the magnet A controlling the switch C works, so arranged that the hand D must be in contact with the contact-plate E for a certain length of time before the electromagnet A closes the switch C.

Fig. 3 illustrates how the synchronism device may be used on a two-phase system. In this case the two phases of the machine H are used to excite the coils 1 and 2, and the latter are connected directly to the terminals of machine H without the necessity of any further means for effecting phase displacement. Coil F is connected to one of the two-phase branches of the generator G; otherwise the synchronizer is used in the same manner as with single-phase machines. It is evident, however, that the invention may be used on a two-phase system in the same manner as shown applied to a single-phase system in Figs. 1 and 2. It will also be evident that the synchronism-indicator may be applied to any polyphase system without the necessity of any further phase-modifying means for the currents in the two relatively-fixed coils by adjusting the angle between the coils to the supplement of the phase-angle between the currents circulating in the coils. Thus in a three-phase system the two relatively-fixed coils could be excited directly by currents differing by one hundred and twenty degrees without any auxiliary phase-modifying means. Under these circumstances the instrument could be made to read correctly by adjusting the mechanical angle between the coils to sixty degrees. This being an obvious modification it is not deemed necessary to herein illustrate it.

It will be understood that other arrangements than those which I have described may be used for accomplishing the results aimed at, and therefore various minor modifications and changes in the details of construction may be made without departing from the spirit of my invention.

Having thus described my invention, what I claim, and desire to secure by Letters Patent, is—

1. In a synchronism-indicator, the combination of two relatively movable elements, one carrying a single coil, the other carrying two relatively fixed coils angularly displaced, means for connecting the first element to one source of alternating electromotive force, means for connecting the second element to another source of alternating electromotive force and means for displacing the phase of the currents in the two coils of the second element; substantially as described.

2. In a synchronism-indicator, the combination of two relatively movable elements, one consisting of a single coil and the other consisting of two relatively fixed coils angularly displaced, means for connecting the first element to one source of alternating electromotive force, means for connecting the second element to another source of alternating electromotive force, and means for displacing the phase of the currents in the two coils of the second element; substantially as described.

3. In a synchronism-indicator, the combination of two relatively movable elements, a plurality of sources of alternating electromotive force, means for energizing one element with current derived from one source of electromotive force, means for energizing the other element with current derived from another source of electromotive force, and means for creating two opposing torques between said elements varying with the phase relations of the two sources; substantially as described.

4. In a synchronism-indicator, the combination of two relatively movable elements, a plurality of sources of alternating electromotive force, means associated with one element for producing a field varying in phase with the phase of one electromotive force, and means associated with the other element for producing two phase-displaced fields, subject to variations in the phase of another electromotive force; substantially as described.

5. In a synchronism-indicator, the combination of two relatively movable elements, a plurality of sources of alternating electromotive force, means for energizing one element with current derived from one source of electromotive force, means for energizing the other element with current derived from another source of electromotive force, means for creating two opposing torques between said elements varying with the phase relations of the two sources, an apparatus operated by the movable member, and means for limiting its operation to a period of a definite phase relation between the two sources of predetermined duration; substantially as described.

6. In a synchronism-indicator, the combination of two relatively movable elements, a plurality of alternating-current circuits, means for energizing one element from one circuit, means for energizing the other element from another circuit, means for creating two opposing torques between the said elements varying with the phase relations of the currents in the two circuits, an apparatus operated by the movable member, and means for limiting its operation to a period of phase similarity in the two circuits of predetermined duration; substantially as described.

7. In an alternating-current instrument, the combination of two relatively movable elements, a plurality of alternating-current circuits, means for energizing one element from one circuit, means for energizing the other element from another circuit, means for creating two opposing torques between the said elements varying with the phase relations of the currents in the two circuits, an apparatus operated by the movable member, and means for limiting its operation to periods of predetermined phase relations between the two circuits; substantially as described.

8. The combination of two members relatively movable, two alternating-current circuits, means for energizing one element from one circuit, means for energizing the other element from another circuit, means whereby the movable member is caused to assume different angular positions corresponding to the phase relations between the currents in two circuits, a switch operated by said movable member and means for limiting the operation to predetermined angular positions of the movable member; substantially as described.

9. The combination of two members relatively movable, two alternating-current circuits, means for energizing one element from one circuit, means for energizing the other element from another circuit, means whereby the movable member is caused to assume different angular positions corresponding to the phase relations between the currents in two circuits, a switch operated by said movable member, and means for limiting the operation to a period of a definite phase relation between the two circuits of predetermined duration; substantially as described.

10. The combination of two relatively movable elements, a plurality of alternating-current circuits, means for energizing one element from one circuit, means for energizing the other element from another circuit, an apparatus operated by the movable element, and means for limiting its operation to a period of a definite phase relation between the currents in the two circuits of predetermined duration; substantially as described.

11. The combination of two relatively movable elements, a plurality of alternating-current circuits, means for energizing one element from one circuit, means for energizing the other element from another circuit, a switch adapted to be closed at certain positions of the movable element, and a retarding device to prevent such closure until after the lapse of a given time; substantially as described.

12. The combination of two members relatively movable, two alternating-current circuits, means for energizing one element from one circuit, means for energizing the other element from another circuit, means whereby the movable member is caused to assume different angular positions corresponding to the phase relations between the currents in the two circuits, a switch, means tending to close the switch at certain positions of the movable member, and a time element preventing the closure of the switch until after the lapse of a definite time; substantially as described.

13. A synchronism-indicator, comprising a field-coil in circuit with one dynamo or unit, an armature having two coils one of which is in series with an inductive resistance and the other with a non-inductive resistance, but both coils in circuit with the dynamo which is to be paralleled with the first; substantially as described.

14. In a synchronism-indicator, the combination of two sources of electromotive force, a torque-producing element, a second element, movable relatively to the first, and producing two torques, means for adjusting said two latter torques with relation to each other, as to produce points of supersensitiveness in the cycle, and means for connecting the two elements to the two sources of electromotive force; substantially as described.

15. In a synchronism-indicator, the combination of two sources of electromotive force, a field-producing element, a second element movable relatively to the first, and producing two fields electrically and mechanically displaced, said fields being so displaced that the mechanical displacement is the supplement of the electrical displacement, and means for connecting one element to one source of electromotive force and the second element to the other source; substantially as described.

16. In a synchronism-indicator, the combination of two elements relatively movable, a plurality of alternating-current circuits, means for producing two opposing torques, between said elements, varying with the phase relations between the currents in the two circuits, whereby the movable element is caused to assume positions corresponding to such phase relations, a switch operated by such movable element, and means for adjusting the two torques with relation to each other as to produce points of supersensitiveness; substantially as described.

17. In a synchronism-indicator, the combination of two elements relatively movable, a plurality of sources of alternating electromotive force, means for energizing one element from one source, means for energizing the other element from another source, means for producing two opposing torques between said elements, varying with the phase relations of the two sources, the two torques being adjusted with relation to each other as to produce points of supersensitiveness in the indication of the movable member; substantially as described.

18. In an alternating-current instrument, the combination of two members relatively movable, two alternating-current circuits, means for energizing one element from one circuit, means for energizing the other element from another circuit, means whereby the movable member is caused to assume different angular positions corresponding to the phase relations between the two circuits, and means for causing points of supersensitiveness in its movement; substantially as described.

19. The combination of a device responsive to the change in phase relations between two different alternating currents, an apparatus operated thereby, and means for giving such device a supersensitive action at certain phase relations; substantially as described.

20. In an alternating-current instrument, the combination of two relatively movable elements, two sources of alternating current, means for energizing one element from one source, means for energizing the other element from the other source, means associated with said elements for closing a paralleling switch, and auxiliary means associated with said closing means, whereby said switch may be closed only during the time the dynamos are within the arc of safety; substantially as described.

In testimony whereof I affix my signature in presence of two witnesses.

PAUL M. LINCOLN.

Witnesses:
PHILIP P. BARTON,
W. K. GIBBONEY.